March 3, 1953 E. A. JOHNSON 2,630,552

DATA DECODING SYSTEM

Filed April 25, 1949 3 Sheets-Sheet 1

ERIC A. JOHNSON
*Inventor*

By Moore & Hall
*Attorneys*

March 3, 1953 E. A. JOHNSON 2,630,552

DATA DECODING SYSTEM

Filed April 25, 1949 3 Sheets-Sheet 2

ERIC A. JOHNSON
Inventor

By Moore & Hall
Attorneys

March 3, 1953 E. A. JOHNSON 2,630,552

DATA DECODING SYSTEM

Filed April 25, 1949 3 Sheets-Sheet 3

ERIC A. JOHNSON
Inventor
By Morse & Hall
Attorneys

Patented Mar. 3, 1953 2,630,552

UNITED STATES PATENT OFFICE 2,630,552

DATA DECODING SYSTEM

Eric Arthur Johnson, Malvern, England, assignor to Minister of Supply, in His Majesty's Government of the United Kingdom of Great Britain and Northern Ireland, London, England Application April 25, 1949, Serial No. 89,535
In Great Britain April 28, 1948

24 Claims. (Cl. 318—28)

The present invention relates to apparatus for decoding information. The invention is particularly, although not exclusively, concerned with systems for conveying information of the kind in which the information to be conveyed is capable of being represented as a rotation of a shaft. Such systems are used in the transmission of positional data from object locating systems such as radar systems to remote points, for telemetering and like purposes.

It is an object of the present invention to provide a decoding apparatus for purposes such as the above which will enable information to be decoded from signals representing the information in the form of a multi-digit code operating, for example, on a so-called binary scale.

A further object of the invention is to provide a data decoding system for decoding information represented in the form of a digital code which will have a high degree of accuracy.

Yet another object of the invention is to provide such a system in which a high degree of accuracy is combined with reliability and robustness.

Further objects of the invention will appear as the description proceeds.

It is known that numbers may be represented by means of binary codes, according to which, any desired number may be built up as a sum of successive powers of 2. Thus, for example, the number 10 may be written as $2+2^3$, the number 14 may be written as $2+2^2+2^3$, the number 15 by $1+2+2^2+2^3$ and so on. Any number within a certain range may, therefore, be represented by the presence or absence of the powers of 2 from 0 to $n$ where $n$ is the highest power of 2 required for any number in the range and the presence or absence of the representative powers of 2 may be indicated by the presence or absence of a signal. Such an arrangement is employed, for example, in Baudot systems of telegraphy in which a 5-unit code of pulses is used to represent any one of 32 characters which could, of course, be the numbers 1–32.

If now the rotation of a shaft is divided into fractions, the position of the shaft may always be represented as a part of a turn representing a certain number of such fractions and it is then necessary, in order to convey the position of the shaft, merely to indicate the number of basic fractions of a turn through which the shaft has moved from the datum position. If the smallest fraction of a turn it is desired to consider, is say $\frac{1}{64}$, the position of the shaft can at any time be reproduced by transmitting one of the numbers 1 to 64. This can be achieved by means of a six-impulse code. Since, however, in general it will be desired to transmit angular position to a greater degree of accuracy it will normally be necessary to provide a low speed arrangement for transmitting the angular position of the shaft to the nearest $\frac{1}{64}$ turn and to provide a high speed or fine reading shaft, geared to the first and representing by each rotation a fraction only of the main shaft rotation. The position of this fine reading shaft can then likewise be transmitter to the nearest $\frac{1}{64}$ turn by means of a six-digit code. By these means any desired degree of accuracy may be obtained in the transmission of angular positions by employing a sufficient number of fractional divisions of the shaft rotations, a sufficient number of shafts geared together to multiply the shaft rotation, and a sufficient number of digits to represent by binary or like code, the positions of all the geared shafts of the system.

The present invention is based on the above described principle of transmitting shaft rotations by reference to a binary code.

In order that the invention may be more clearly understood, reference will now be made to the accompanying drawings which illustrate diagrammatically some forms which the apparatus proposed, according to the invention, may take.

Figure 1:
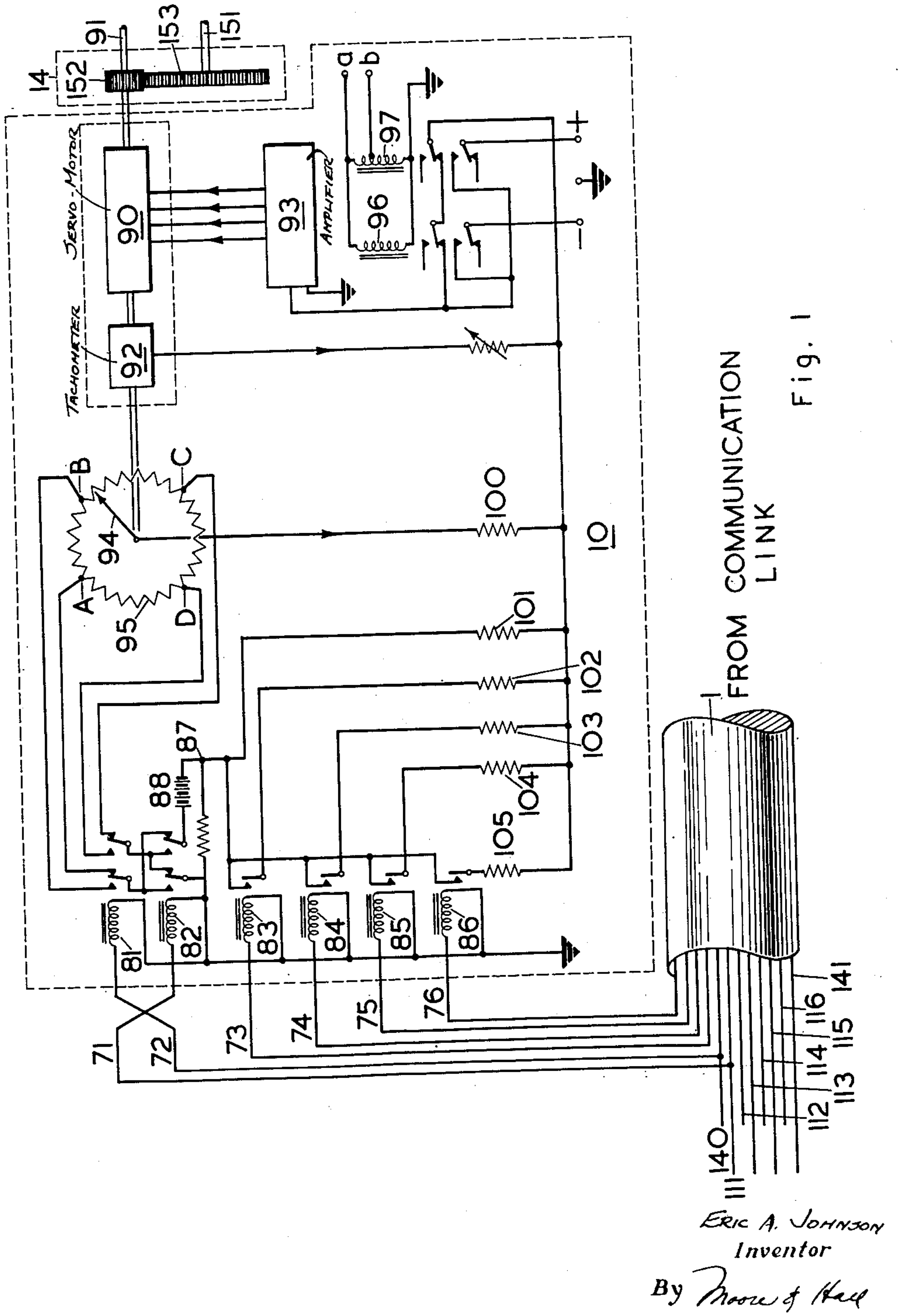
Fig. 1 is a circuit diagram of a decoding apparatus according to the invention.

Referring first to Fig. 1, this diagram illustrates a decoding apparatus which may constitute a "fine" or "high speed" decoder which receives signals representing a shaft position to be set up, in the form of "mark" and "space" signals through six input circuits 71 to 76. Each input circuit comprises a relay 81–86 respectively, the function of two of which, namely 81 and 82, differs from those of the remainder and will be described separately. The decoder further comprises a servomotor 90 which drives a shaft 91, which constitutes the output shaft of the decoder and operates to set up on the appropriate dials or in the appropriate apparatus, the angular position to be reproduced. The servomotor 90 also drives a generator 92 which provides a stabilising feed-back signal for an amplifier 93 from which the servomotor is controlled according to known principles. The arrangement may, for example, be of the kind described in British patent specification No. 606,673, to F. C. Williams. The same shaft operates the slider 94 of a linearly wound closed circle potentiometer 95 having four tapping points A, B, C, and D. These four tapping points apply to the potentiometer 95 an energising voltage in a particular pattern controlled by the contacts of relays 81 and 82 and derived from a battery source 88. Inspection of the circuit will show that the presence or absence of a signal in input circuit 71 (corresponding to a "1" or "0" in the binary number representing the shaft position to be set up) will determine the sense of the voltage applied between two diametrical points on the potentiometer, while the presence or absence of a signal in input 72, which controls relay 81, will determine which pair of diametrically opposed taps will be energised. The wiper 94 taps off from potentiometer 95 a voltage which is applied as a bias to the amplifier 93 of the servomotor through a relay circuit comprising relays 96 and 97, the function of which will be explained later. The value of the bias voltage applied to the servomotor amplifier determines whether the servomotor 90 will be driven and in which direction it will be driven, so that the wiper 94 will tend to be driven to such a position on the potentiometer that bias corresponding to zero energization of the amplifier 93 is found. This position constitutes a null point which may be caused to lie in any one of the four sections of the potentiometer 95 according to the settings of relays 81 and 82, and therefore, in accordance with the first two digits of the binary number constituting the incoming information. The position of the output shaft 91 is, therefore, determined to the nearest $\frac{1}{4}$ turn by the two relays 81 and 82.

The principles above described could be extended further by the provision of further tapping points on potentiometer 95 to determine the output shaft position to closer fractions. In the arrangement shown, however, a different expedient is employed for the finer settings. It will be observed that each of the contacts of the relays 83 to 86 controls a bias circuit for applying a bias voltage from the point 87 to the amplifier 93. The resistors 101, 102, 103, 104 and 105 are given suitable values, such that the operation of each relay 83, 84, 85 or 86 changes the effective bias voltage applied to amplifier 93 by the appropriate fraction corresponding to the desired fractional turn of the output shaft in response to a signal on the respective input line.

Thus relay 83 when operated applies a voltage equal and opposite to that applied to the potentiometer 95 to resistor 102 connected to the input of the amplifier 93 the value of resistor 102 being exactly four times that of resistor 100 which connects potentiometer brush 94 to the amplifier. In this way the bias on the amplifier 93 is so changed that the null point on potentiometer 95 is moved through $\frac{1}{8}$ turn. Resistor 103 is twice the value of resistor 102 and resistor 104 is twice the value of resistor 103 while resistor 105 is twice the value of resistor 104 so that the circuits controlled by relays 84, 85 and 86 have the effect of moving the null point by $\frac{1}{16}$, $\frac{1}{32}$ and $\frac{1}{64}$ turn respectively. The arrangement may be regarded as providing the equivalent of a grounded tapping point on battery 88, the effective position of which is varied by varying the combination of resistors switched into circuit.

In other words the operation of each relay has the same effect as if the null point on potentiometer 95 were moved by the fraction of a turn corresponding to the respective input circuit. The servomotor is, therefore, operated until the new null point is found. In this manner the output shaft is set into the desired angular position to the nearest $\frac{1}{64}$ turn.

As stated above, the bias controlling the amplifier is applied thereto through a circuit controlled by relays 96 and 97. These relays are energised from the circuit of a further part of the decoder which may be regarded as the "course" decoder, operating on a further six input signals and which is later described with reference to Fig. 2, points *a* and *b* of Fig. 1 being connected to points *a* and *b* of Fig. 2. Relay 96 operates when a clockwise error is indicated by these further signals and relay 97 when an anti-clockwise error exists. Operation of relay 96 applies negative bias from an external source to the amplifier 93 to drive the servomotor in the correct direction to reduce the error. Relay 97 applies a positive bias for the same purpose. Whenever either of the relays 96 and 97 is operated, the bias circuit for the fine decoder is disconnected from the amplifier 93 so that the servomotor can be controlled solely by the "course" decoder and operated at full speed until the error is reduced to such an extent that the relay 96 or 97 which has been operated drops off. The bias circuit for the fine decoder will then be completed and the final alignment effected under control of this bias.

Figure 2:
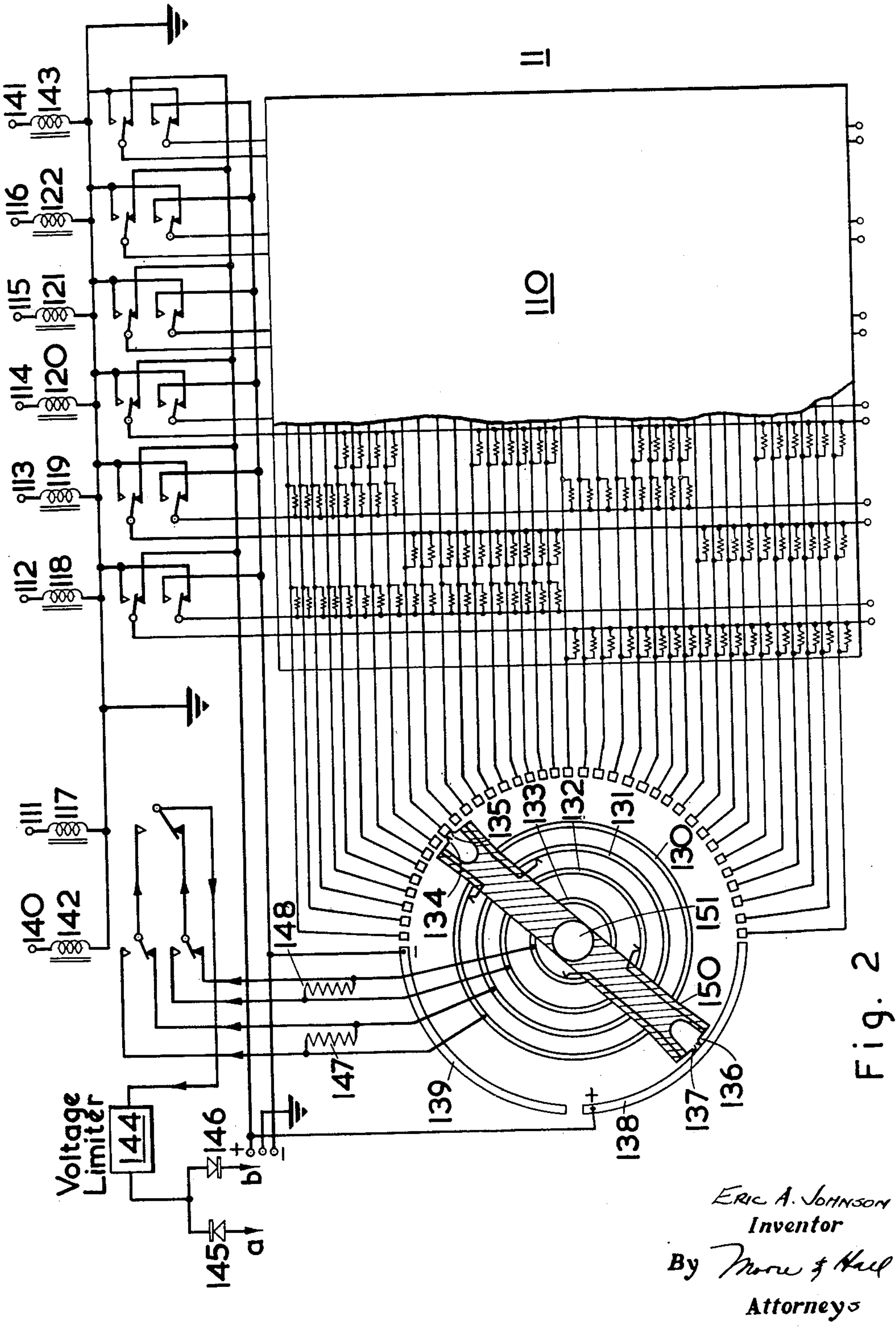
Fig. 2 is a circuit diagram of a decoding apparatus according to the invention which may be used alone or in conjunction with an apparatus of the kind shown in Fig. 1.

The arrangement used for the "coarse" decoder, which may of course constitute the only decoder in a system having less accurate working is shown in Fig. 2. As shown, the decoder comprises a commutator which, in this case, is provided with a double ended wiper arm 150 having double brushes at both ends mounted on a shaft 151 geared to shaft 91 of Fig. 1 through reduction gearing 152, 153 (Fig. 1). One half of the commutator is divided into two segments only, the other half being divided into 36 contacts which are connected through the resistance network, shown only in part in the drawings, and designated by the general reference 110, with six input circuits 111 to 116. These six input circuits comprise relays 117 to 122 which are operated or not according to the code signals received. The resistance values in the resistance network 110, are graded from left to right in vertical columns according to a scale which gives effect to the code relationship between the six input circuits, and the interconnection between the commutator segments and the input circuits is such that, for any given combination of code digits a voltage pattern is set up on the commutator contacts, which presents a null value on one particular contact and voltages increasing positively on one side of this contact and negatively on the other side. The commutator has four slip rings 130, 131, 132 and 133 and one pair of brushes 134 and 135 on one end of the wiper arm, connect to slip rings 130 and 131 respectively, while brushes 136 and 137 on the other end of the wiper arm connect to slip rings 132 and 133 respectively. The two segments into which the one half of the commutator is divided, namely segments 138 and 139, are connected respectively to positive and negative voltages.

Two further input circuits 140 and 141 are also provided which include relays 142 and 143. These inputs derive their signals from the fine unit and correspond respectively to ¼ turn of the fine unit and ½ turn of the fine unit, or in other words, the signals applied are the same as those applied to input lines 72 and 71 of the fine unit respectively.

The operation of the arrangements so far described, is as follows. The input at 111 corresponds to the first digit of the coarse signal and by operating the relay 117 or not, determines to which pair of the brushes 134, 135, 136 and 137 the output circuit (hereinafter described) is connected. Thus it is arranged that the operative pair of brushes is the pair which should find itself contacting the one half of the commutator which is divided into small contacts when the shaft is correctly aligned. The voltage pattern set up on the small commutator contacts by the inputs at 112, 113, 114, 115, 116 and 141 determines as above described, which of these contacts represents the null position for the wiper arm and the voltages fed out by the output circuit from the brushes on the wiper arm will determine by their sign which way the wiper arm must move to reach the null. Since the operation of relay 117 determines that the brushes in contact with the small segments when the system is aligned are the operative brushes in this search, the apparatus is prevented from tending to reset itself by the longest route. When the null contact is reached the commutator is set to its required position to the nearest 1/72 turn since there are 36 contacts on one half of the commutator. The position of the shaft 91 is thus determined to within ½ turn since the brushes selected by the relay 117 will seek a "null" voltage which will only be found among the small contacts on the right hand side of the commutator as shown in the drawing. Finally, the operation or not of relay 142 determines which of the two brushes of the wiper arm in contact with the commutator segments shall determine the null position of the wiper arm. The brushes are connected together in pairs as shown, by high resistance leaks 147 and 148 whereby when either brush is out of contact with any segment it will take up the voltage of the other brush. Thus the wiper arm of the coarse unit is set to the nearest 1/144 of a turn so that by virtue of the gearing between the coarse and fine units, the fine unit will automatically now be set within the correct quadrant for the null which it is required to find.

The output voltage from the commutator will depend upon the conditions and may vary between the two extremes of the voltage supply in steps determined by the gradation of the resistors in the resistor network. These voltage steps may be of the order of five volts so that a voltage of at least five volts is available at the output whenever the coarse shaft is off the null position. The output circuit, therefore, includes the voltage limiting stage 144 which limits the output to a maximum of 5 volts (assuming this to be the chosen voltage for the voltage steps). As above described, the output voltage will vary in sign according to the sign of the error or misalignment between the position of the output shaft and the position it is required to take up. This voltage, therefore, may be used according to its sign to operate either the relay 96 or the relay 97, in the fine unit shown in Fig. 1, to disconnect the fine unit bias network from the amplifier 93 and connect thereto either a positive or negative control voltage for driving the servomotor in the correct direction to reduce the error. To this end rectifiers 145 and 146 are included in the connections to the relay 96 and 97 to ensure that the correct relay is operated by a coarse unit output of given sign.

Figure 3:
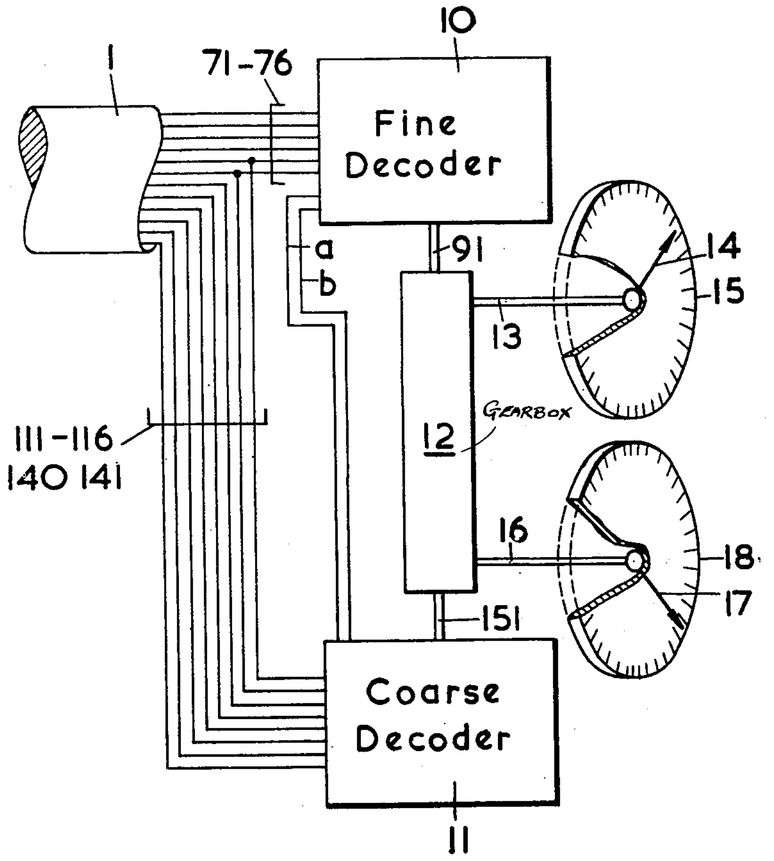
Fig. 3 is a block schematic representation of a system employing an apparatus according to Fig. 1 in combination with an apparatus according to Fig. 2.

The correlation between the apparatus shown in Fig. 1 and that shown in Fig. 2 will be clearly understood from the general layout illustrated in Fig. 3. In this figure the input cable 1 containing all the leads 77 to 76, 111 to 116 and 140 and 141 extends from a communication link such as an overland multiple-wire link or from the terminal of a radio link so that the encoded information appears as mark and space signals on all the individual input leads of this cable. Leads 71 to 76 are shown entering the fine decoder 10 (which takes the form described with reference to Fig. 1) the output shaft 91 of which is coupled in the gearbox 12 to a shaft 13 on which is mounted a pointer 14 associated with a dial 15 (shown partly broken away). The remaining leads feed the encoded information to the coarse decoder 11 which is of the form described with reference to Fig. 2. The fine decoder and the coarse decoder are coupled together through the gearbox 12 which includes the reduction gearing 152 and 153 of Fig. 1. Leads *a* and *b* are shown connecting the fine decoder to the coarse decoder for the operation of relays 96 and 97 of the fine decoder (see Fig. 1) in accordance with the settings of relays 117 and 142 of the coarse decoder (see Fig. 2). The coarse decoder is coupled through to gearbox 12 and this to a coarse output shaft 16 on which is mounted the pointer 17 associated with the coarse dial 18.

It will now be seen that the apparatus above described when supplied with an 11 digit number characterising, according to the chosen code, a given shaft position, the coarse unit will give an output voltage which renders the fine unit inoperative and controls the servomotor to drive the apparatus in the right sense to align with the position characterised by the code number set up. When the coarse unit has found its correct position to within 1/144 of a turn and the fine unit is within ¼ turn of its correct position, the output from the coarse unit ceases, the fine unit is put in control of the servomotor and the system is finally aligned accurately.

It should be pointed out that in the coarse unit above described, the size of the commutator contacts and the spacing of the brush contacts on the wiper arm are both critical. For correct operation, in the manner described, the brush spacing should be one half the stud spacing augmented by the width of the gaps between the studs.

It will be appreciated that systems according to the invention may vary considerably from those described in detail. For example, by choosing a gear ratio between the coarse and fine units of a system which is a power of two, the coding may follow a straightforward binary system, and some of the complications, involved by the use of the ratios chosen for the present example, avoided.

Obviously, moreover, the "coarse" and "fine" decoders described above may be interchanged in their functions or may be used individually according to requirements.

The encoded information supplied to the input circuits 71, 72, 73, 74, 75, 76, 111, 112, 113, 114, 115 and 116 may be derived in a number of different ways. Commonly, however, systems according to the present invention will find application to problems involving the transmission of data over considerable distances. The transmission of this data may be effected in any desired manner. For example a 12-core cable may be made to feed the appropriate signal voltages directly into the input lines enumerated above from an encoding apparatus of any desired form. One form such apparatus may take is described in my co-pending application Serial No. 89,534, filed April 25, 1949.

In some circumstances it may be preferable to transmit signals representing the coded information to be applied to the input lines above enumerated sequentially. For example, a "mark" or "1" digit may be represented by a signal pulse of one polarity, magnitude or width or on a particular carrier frequency while a "space" of "0" digit is represented by a signal pulse of the opposite polarity or of a different width amplitude or different carrier frequency, the signals being transmitted sequentially over a line or radio link. The appropriate signal combination can then be built up on the input lines from these sequentially arriving signals. If the data represented by the signals is changing the sequence of signals representing the data must be compiled and transmitted frequently, that is to say, the rate of transmission must be high in relation to the rate at which the information is changing. It will, in general, moreover, as will be apparent to those skilled in the art, be necessary to provide means for synchronising transmission of impulses representing the various digits of the code with the receiving apparatus, so that the various digits may be assigned their proper significance in the code and applied to the proper input lines.

The apparatus according to the invention is applicable to any problem requiring the conversion of information represented by a code number into a shaft rotation.

The claims make reference to "states" and to "sequence" of the digits of a code group. The term "state" is herein defined as an electrical condition which differentiates a digit of one significance from a digit of a different significance. It is inclusive of prior art systems of conveying information by code trains utilizing characteristic digits. Thus the prior art shows for instance that differing code units, having different "states," may be represerted by "dot" and "dash," by "mark" and "space," by "pulse" and "absence-of-pulse," by different predetermined potential levels, or by transmission at different, predetermined frequencies.

The term "sequence" is defined to be the order of occurrence of digits, or code units, of a code group representing information to be transmitted or interpreted. For instance, if a position represented by the code group 101101 (corresponding to a position 45) were to be transmitted, the "states" could be represented by "marks" (for the 1's) and by "spaces" (for the 0's), and the "sequence" would be: mark-space-mark-mark-space-mark.

I claim:

1. Electrical information decoding apparatus comprising a plurality of input circuits each peculiar to a code element of a multi-digit code, circuit selecting means connected in each of said input circuits, potentiometer means, a source of voltage feeding said potentiometer means, through a network set up by said circuit selecting means, an output circuit for said potentiometer means feeding an output therefrom in dependence upon the conditions set up by said circuit selecting means in response to code element signals applied to said input circuits, means representing by its position the decoded information, a motor driving said last named means, means for energising said motor by reference to the voltage in said output circuit and a driving connection between said motor and said potentiometer means to adjust said potentiometer means in the appropriate sense to reduce the voltage in said output circuit.

2. Electrical information decoding apparatus comprising a potentiometer having a plurality of input connections and an output circuit, circuit-changing means connected in said input connections, a source of voltage feeding said circuit-changing means, a plurality of signal circuits each peculiar to an element of a multidigit code controlling said circuit changing means, driving means for said potentiometer and control means for controlling said driving means, said control means being connected in the output circuit of said potentiometer.

3. Electrical information decoding apparatus comprising a closed ring potentiometer having input connections to spaced points around the ring, a source of voltage, circuit changeover relays connecting said source of voltage to a selected pair of spaced points, a plurality of signal circuits each peculiar to an element of a multidigit code controlling said relays, a voltage pick-off brush for said potentiometer, driving means driving said voltage pick-off brush and control means controlling said driving means said control means being connected to said voltage pick-off brush.

4. Electrical information decoding apparatus comprising driving means, an amplifier feeding said driving means and a source of error voltage feeding said amplifier, said source of error voltage comprising a closed ring potentiometer driven by said driving means, a source of voltage, a plurality of circuit-changing relays connected between said source of voltage and a plurality of tapping points on said potentiometer, an operating circuit for each of said circuit-changing relays, each peculiar to an element of a multidigitcode, a plurality of bias circuits each including a relay and each peculiar to an element of said multi-digit code connected to said source of voltage and connections for applying the output voltage from said potentiometer and a combination of outputs from said bias circuits to said amplifier.

5. Electrical information decoding apparatus comprising a potentiometer in the form of a commutator having a plurality of contact segments and a wiper arm movable over said contact segments, a source of voltage, a plurality of code circuits each connected to a contact segment of said potentiometer commutator, a plurality of relays each controlling the connection of said source of voltage to a combination of said code circuits each of said relays being allotted to an element of a multi-digit controlling code, driving means for driving said wiper arm and control means for said driving means connected to a contact moved by said wiper on said commutator contact segments.

6. Electrical information decoding apparatus, as claimed in claim 5 said commutator having a plurality of contact segments connected to said code circuits distributed over one half of its periphery, two further contact segments each extending over one half of the remaining half of its periphery and each connected to one pole of said source of voltage, a wiper arm having contacts at both ends contacting diametrically opposite points on the commutator periphery and means for determining the operative end of said wiper arm by reference to a digit of said multi-digit code.

7. Electrical information decoding apparatus as claimed in claim 6 wherein each end of said wiper arm carries two closely spaced contacts and means are provided for determining the operative one of the operative pair of contacts by reference to a digit of said multi-digit code.

8. Electrical information decoding apparatus comprising a commutator having a plurality of contact segments each connected to a coding circuit, a source of operating voltage, a plurality of relays each peculiar to a digit of a multi-digit code controlling the application of said source of voltage to combinations of said coding circuits representative of information conveyed by said multi-digit code, a wiper arm having two brush contacts movable in contact with said contact segments, relay means operated in accordance with a digit of said multi-digit code arranged to select one of said two brush contacts for operation, a ring potentiometer, relay circuits controlled by related digits of said multi-digit code operative to select diametrically opposed tapping points on said ring potentiometer and to connect thereto a further voltage source, a plurality of bias circuits, relays each controlled by signals representing digits of said multi-digit code controlling each of said bias circuits, means for combining the output voltage from the wiper of said potentiometer and the bias voltages set up in said bias circuits, means controlled by the output from said commutator for connecting the voltage so combined or a separate source of voltage alternatively to amplifier means, driving means controlled by said amplifier means and gearing connecting said driving means, the wiper of said potentiometer and the wiper arm of said commutator.

9. Apparatus for the decoding of a code sequence of digits each digit of which may be represented by one of two electrical states comprising an input, said input having a plurality of terminals each of which is associated with a digit of said code sequence, a resistance network, a source of potential coupled to said network, an output from said network, said output having a plurality of terminals, means responsive to the state and sequence of said code units in said input for controlling said resistance network to produce a distinctive pattern of potential distribution having a null point on said output terminals, commutator means having a plurality of segments and a movable contact arm for engaging said segments, means coupling said output terminals to said segments, driving means operatively connected to said movable contact arm, and means responsive to a potential picked off said commutator segments by said contact arm for controlling said driving means to position said contact arm at said null point.

10. Apparatus as claimed in claim 9 having indicating means coupled to said driving means.

11. Apparatus as claimed in claim 9 wherein said null point appears on only one of said plurality of segments.

12. Apparatus for the decoding of a binary digital code sequence comprising an input, said input including a plurality of terminals each of which is respectively associated with a single digit of said code sequence, an output, a source of potential, means responsive to the states and sequence of digits in said input for controlling said source of potentials so as to set up a distinctive pattern of potential distribution in said output, and indicating means responsive to said potential distribution, said indicating means comprising: commutator means including a plurality of segments and a wiper arm, means coupling said pattern of potential distribution to said segments, and driving means for positioning said wiper arm to a predetermined point in said potential distribution.

13. Apparatus as claimed in claim 12 wherein said driving means include means responsive to certain digits of said digital code sequence for the control of said driving means.

14. Apparatus for the decoding of a binary digital code sequence comprising an input, said input having a plurality of terminals connected to certain units of said code sequence, a source of potential, an output, means connected to said source of potential and responsive to the states and sequence of digits in said input for controlling said source of potential so as to set up a distinctive pattern of potential distribution in said output, means connected to said output for the interpretation of said pattern of potential distribution, said last named means including means distributing said potential pattern over a surface, movable contact means, and means positioning said contact means to a predetermined point in said potential pattern on said surface.

15. Apparatus for the decoding of a binary digital code sequence comprising a first input, means connecting certain digits of said binary digital code to said first input, a first source of potential, control means responsive to the states and sequence of said digits in said first input for controlling said first source of potential, first output means connected to said control means, said first output means having a pattern to potential distribution including a null point and varying in response to said control means, commutator means having a plurality of segments connected to said first output and a wiper arm, driving means for positioning said wiper arm to said null point in said pattern of potential distribution, a second input, means connecting certain other digits of said binary digital code to said second input, a second source of potential, potentiometer means connected to said second potential means, said potentiometer means having a resistive element and a movable contact contiguous with said resistive element, means responsive to the states and sequence of digits in said second input for controlling said second source of potential to set up a further potential pattern with a null point on said resistive element of said potentiometer, and means connecting said driving means to said movable contact for positioning said movable contact to said last named null point.

16. Apparatus as claimed in claim 15 including means responsive to the position of said movable contact of said potentiometer for controlling said driving means in the positioning of said movable contact.

17. Apparatus as claimed in claim 16 said means responsive to the position of said movable contact including amplifier means, said amplifier means having an input and an output, and means connecting said last named input to said movable contact and said last named output to said driving means.

18. Apparatus as claimed in claim 17 wherein the output of said amplifier varies in response to changes in said amplifier input, said amplifier input varying the bias of a stage in said amplifier.

19. Apparatus as claimed in claim 18 including means responsive to the position of said wiper arm of said commutator means for preventing said amplifier means from controlling said driving means until said wiper arm has been positioned to said first named null point.

20. Apparatus as claimed in claim 15 including means responsive to certain digits in said second input, said last named means being connected to said second source of potential to vary the position of said second named null point on said resistive element.

21. Apparatus as claimed in claim 15 including gearing means coupling said wiper arm and said movable contact so as to position said movable contact on a predetermined portion of said resistive element when said wiper arm is positioned to said first named null point.

22. Apparatus as claimed in claim 21 including indicating means, said indicating means having shafts coupled to said wiper arm and to said movable contact.

23. Apparatus as claimed in claim 15 wherein said means responsive to the states and sequence of digits in said second input for controlling said second source of potential includes means responsive to certain units of said digits in said second input for determining the position of said potential pattern on said resistive element, and further means responsive to certain other units of said digits in said second input for determining relative polarity of adjacent points in said potential pattern on said resistive element.

24. Apparatus for decoding a binary digital code sequence comprising a coarse indicating unit having a first input, means connecting certain digits of said code sequence to said first input, first converting means for deriving a distinctive pattern of potential distribution in response to the energization of said first input, said first converting means including a first source of potential, an impedance network connected to said first source of potential and responsive to said first input, and a first output connected to said impedance network, a fine indicating unit having a second input, means connecting certain other digits of said code sequence to said second input, a second converting means for deriving a further pattern of potential distribution in response to the energization of said second input, said second converting means including a second source of potential, control means for said second source of potential, and a second output connected to said second source of potential, and indicator means connected to said first and second outputs for interpreting said patterns of potential distribution.

ERIC ARTHUR JOHNSON.

REFERENCES CITED

The following references are of record in the file of this patent:

UNITED STATES PATENTS

| Number | Name | Date |
|---|---|---|
| 1,768,966 | Tanner | July 1, 1930 |
| 2,007,577 | Lum | July 9, 1935 |
| 2,025,218 | Reinken | Dec. 24, 1935 |
| 2,098,227 | Chauveau | Nov. 9, 1937 |
| 2,128,361 | Hunter | Aug. 30, 1938 |
| 2,436,172 | Kent | Feb. 17, 1948 |
| 2,471,843 | Stamper | May 31, 1949 |
| 2,534,505 | Ergen | Dec. 19, 1950 |
| 2,538,415 | Ergen | Jan. 16, 1951 |